US010699318B2

(12) United States Patent
Chatwin et al.

(10) Patent No.: US 10,699,318 B2
(45) Date of Patent: Jun. 30, 2020

(54) SYSTEMS AND METHODS FOR ITEM DISCOVERABILITY (71) Applicant: Wal-Mart Stores, Inc., Bentonville, AR (US)

(72) Inventors: Richard Chatwin, Los Altos Hills, CA (US); Yashaswini Kotresh, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 889 days.

(21) Appl. No.: 15/011,125

(22) Filed: Jan. 29, 2016

(65) Prior Publication Data
US 2017/0221124 A1    Aug. 3, 2017

(51) Int. Cl.
*G06Q 30/06* (2012.01)

(52) U.S. Cl.
CPC ..... *G06Q 30/0631* (2013.01); *G06Q 30/0603* (2013.01); *G06Q 30/0629* (2013.01)

(58) Field of Classification Search
CPC ............................................... G06Q 30/06–08
USPC ............................................... 705/26.1–27.2
See application file for complete search history.

(56) References Cited

U.S. PATENT DOCUMENTS

| | | |
|---|---|---|
| 6,185,558 B1 | 2/2001 | Bowman et al. |
| 7,383,262 B2 | 6/2008 | Das et al. |
| 8,032,425 B2 | 10/2011 | Yi |
| 8,086,697 B2 | 12/2011 | Goulden et al. |
| 8,290,828 B2 | 10/2012 | Stoppelman |
| 8,645,221 B1 * | 2/2014 | Sarma ................ G06Q 30/0601 705/26.1 |
| 8,838,583 B1 | 9/2014 | Fox |
| 8,996,495 B2 | 3/2015 | Rehman |
| 9,002,858 B1 | 4/2015 | Dassa et al. |
| 9,177,054 B2 | 11/2015 | Nash et al. |
| 2002/0019763 A1 | 2/2002 | Linden et al. |
| 2005/0071251 A1 | 3/2005 | Linden et al. |
| 2010/0114925 A1 | 5/2010 | Shafer et al. |
| 2013/0246415 A1 * | 9/2013 | Davis ................ G06F 17/30864 707/732 |
| 2014/0249960 A1 * | 9/2014 | Mello ................ G06Q 30/0623 705/26.61 |
| 2014/0297630 A1 | 10/2014 | Cao et al. |

OTHER PUBLICATIONS

The Young Person's Guide to the Theil Index: Suggesting Intuitive Interpretations and Exploring Analytical Applications by Pedro Conceição and Pedro Ferreira, 2000 (Year: 2000).*

* cited by examiner

*Primary Examiner* — Ming Shui
(74) *Attorney, Agent, or Firm* — Bryan Cave Leighton Paisner LLP (57) ABSTRACT

In some embodiments, a method can comprise analyzing user interaction with one or more items. In some embodiments, analyzing user interaction with the one or more items can comprise determining a number of impressions for each item of the one or more items. In many embodiments, the method can further comprise determining at least one undiscovered item of the one or more items based at least in part on the analyzing user interaction with the one or more items, estimating a performance of the at least one undiscovered item of the one or more items, promoting the at least one undiscovered item of the one or more items based at least in part on the estimating the performance of the at least one undiscovered item of the one or more items. Other embodiments of related methods and systems are also provided.

20 Claims, 6 Drawing Sheets

310 – User Interaction System

320 - Promotion System

360 – Display System

FIG. 6

SYSTEMS AND METHODS FOR ITEM DISCOVERABILITY

TECHNICAL FIELD

This disclosure relates generally to systems and methods for item discoverability, and relates more particularly to systems to promote undiscovered items, and related methods.

BACKGROUND

Currently, items in a product catalog can be searched or browsed for on an electronic commerce website (eCommerce). When a system for the website receives a request from a user (e.g., customer), the returned page may include items displayed in an order. The order can depend on user preference, such as displaying the items most relevant to the user request first. Items listed first, or earlier, are considered discovered or discoverable. Some items in the product catalog that are later in the order may require the user to click through to one or more additional pages to be displayed. Such items are less likely to be selected by the user, and can be considered undiscovered or non-discoverable. Sometimes, these undiscovered items can have attributes similar to discovered items which can interest the user. Accordingly, there is a need for systems and methods to provide item discoverability for undiscovered items in the product catalog.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform the acts. In some embodiments, the acts can comprise storing a product catalog in a database, the product catalog comprising one or more items and analyzing user interaction with the one or more items. In a number of embodiments, analyzing the user interaction with the one or more items can comprise determining a number of impressions for each item of the one or more items. In many embodiments, the acts can further comprise determining at least one undiscovered item of the one or more items based at least in part on the analyzing user interaction with the one or more items, estimating a performance of the at least one undiscovered item of the one or more items, and determining a tradeoff based at least in part on the estimating the performance of the at least one undiscovered item of the one or more items. In some embodiments, the acts can further comprise promoting the at least one undiscovered item of the one or more items based at least in part on the determining the tradeoff by modifying a ranking of the at least one undiscovered item of the one or more items and facilitating displaying of a modified display configuration based at least in part on the promoting the at least one undiscovered item of the one or more items.

Some embodiments include a method. In some embodiments, a method can comprise storing a product catalog in a database, the product catalog comprising one or more items and analyzing user interaction with the one or more items. In a number of embodiments, analyzing the user interaction with the one or more items can comprise determining a number of impressions for each item of the one or more items. In many embodiments, the method can further comprise determining at least one undiscovered item of the one or more items based at least in part on the analyzing user interaction with the one or more items, estimating a performance of the at least one undiscovered item of the one or more items, and determining a tradeoff based at least in part on the estimating the performance of the at least one undiscovered item of the one or more items. In some embodiments, the method can further comprise promoting the at least one undiscovered item of the one or more items based at least in part on the determining the tradeoff by modifying a ranking of the at least one undiscovered item of the one or more items and facilitating display of a modified display configuration based at least in part on the promoting the at least one undiscovered item of the one or more items.

Various embodiments of systems and methods for item discoverability can include a method comprising analyzing user interaction with one or more items by determining a number of impressions for each item of the one or more items, determining at least one undiscovered item of the one or more items based at least in part on the analyzing user interaction with the one or more items, and estimating a performance of the at least one undiscovered item of the one or more items. In some embodiments, the method can further comprise promoting the at least one undiscovered item of the one or more items based at least in part on the estimating the performance of the at least one undiscovered item of the one or more items, and facilitating display of a modified display configuration based at least in part on the promoting the at least one undiscovered item of the one or more items.

Figure 1:
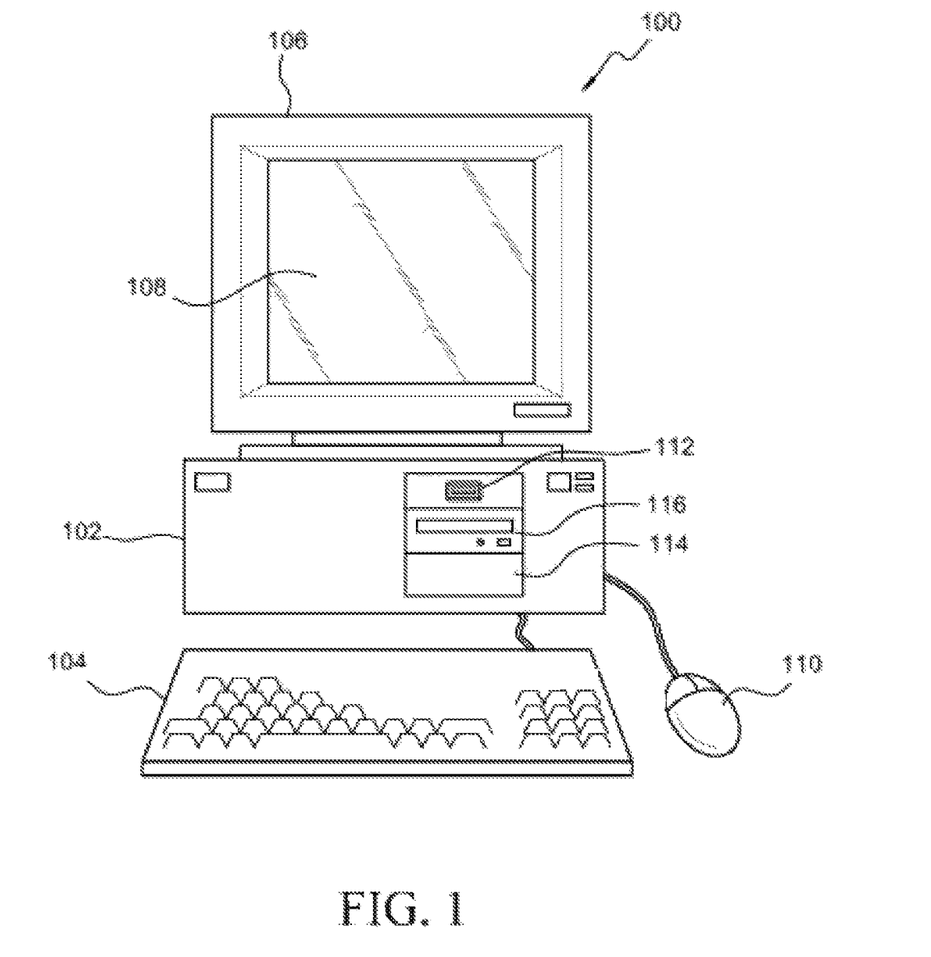
FIG. 1 illustrates a front elevation view of a computer system that is suitable for implementing at least part of a central computer system.
Figure 2:
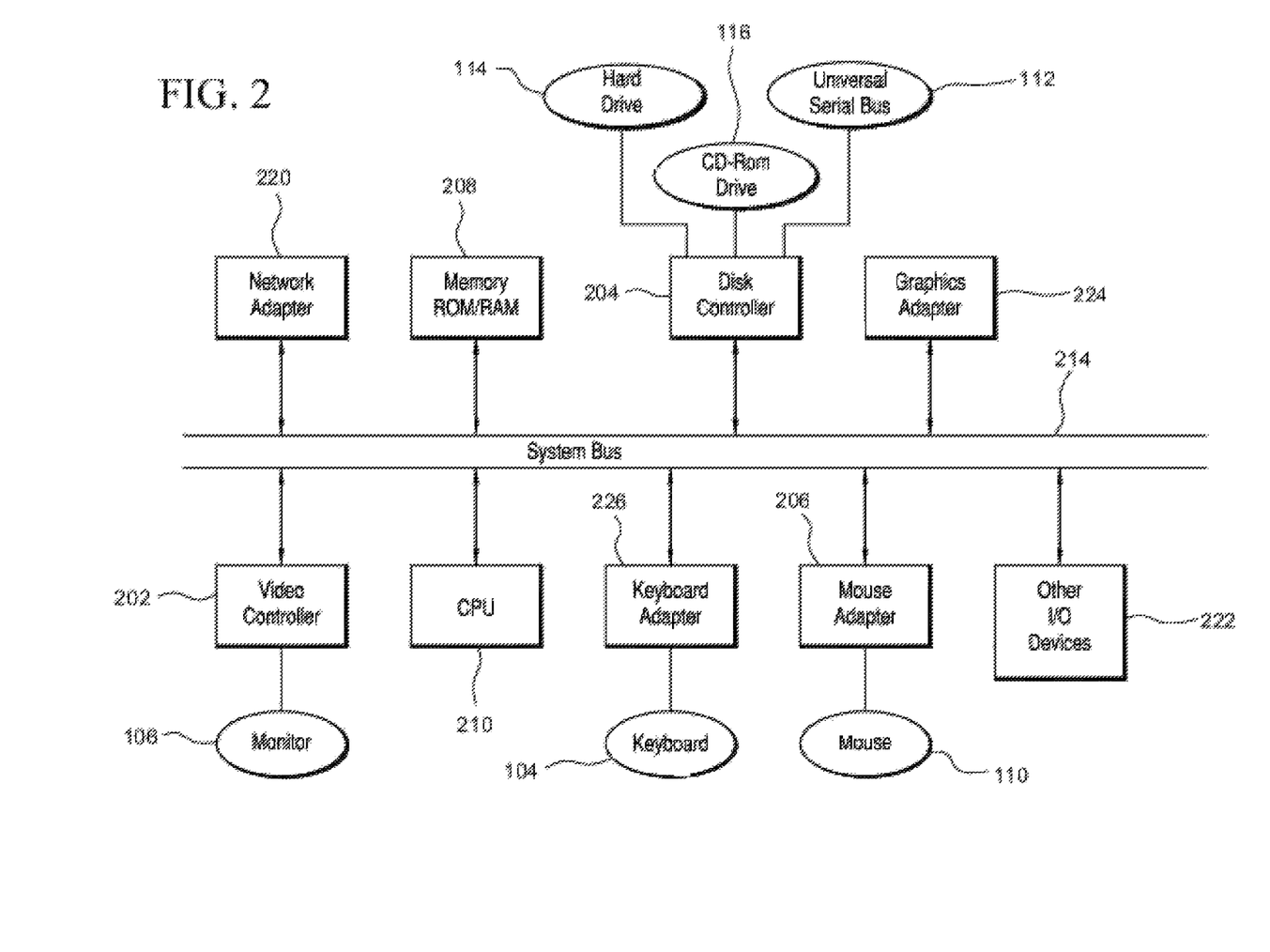
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
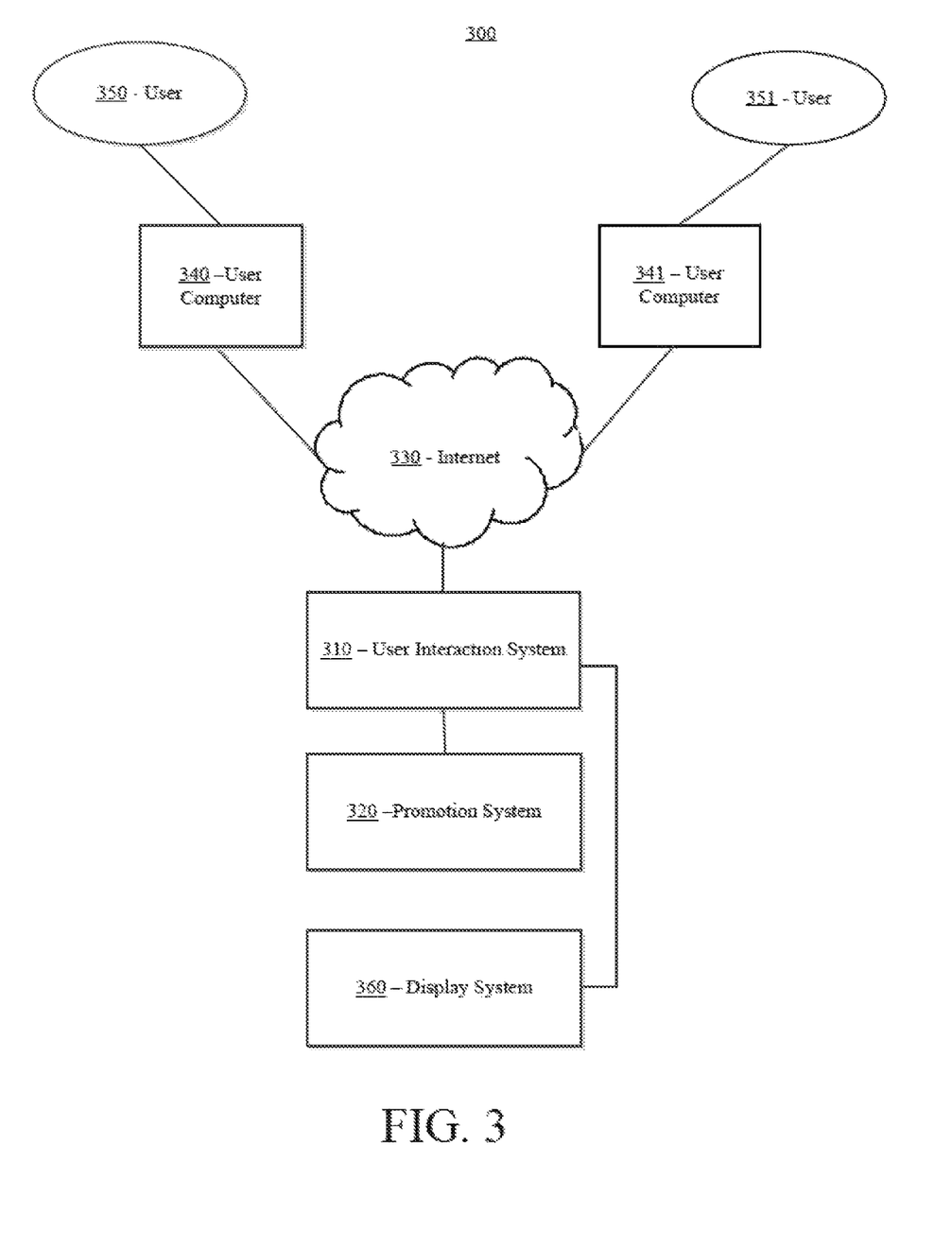
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a user interaction system 310, a promotion system 320, and a display system 360. In some embodiments, user interaction system 310, promotion system 320, and display system 360 can each be a computer system 100 (FIG. 1), as described above, and can each be a single computer, a single server, or a cluster or collection of computers or servers. In some embodiments, user interaction system 310 can be in communication with an inventory system (not shown) which can comprise a product catalog of items, and track distinct items (e.g., stock keeping units (SKUs)) which can be ordered through the online retailer and which can be housed at one or more warehouses. In many embodiments, warehouses can comprise brick-and-mortar stores, distribution centers, and/or other storage facilities.

In many embodiments, user interaction system 310, promotion system 320, and/or display system 360 can each comprise one or more input devices (e.g., one or more keyboards, one or more keypads, one or more pointing devices such as a computer mouse or computer mice, one or more touchscreen displays, microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of user interaction system 310, promotion system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of user interaction system 310, promotion system 320, and/or display system 360. In a similar manner, the processing module(s) and the memory storage module(s) can be local and/or remote to each other.

In many embodiments, user interaction system 310 and/or display system 360 can be configured to communicate with one or more user computers 340 and 341. In some embodiments, user interaction system 310 and/or display system 360 can communicate or interface (e.g. interact) with one or more user computers (such as user computers 340 and 341) through a network or internet 330. Internet 330 can be an intranet that is not open to the public. Accordingly, in many embodiments, user interaction system 310 and/or display system 360 can refer to a back end of system 300 operated by an operator and/or administrator of system 300, and user computers 340 and 341 can refer to a front end of system 300 used by one or more users 350 and 351, respectively. In these or other embodiments, the operator and/or administrator of system 300 can manage order system 300, the processing module(s) of order system 300, and/or the memory storage module(s) of order system 300 using the input device(s) and/or display device(s) of order system 300.

Meanwhile, in many embodiments, user interaction system 310, promotion system 320, and display system 360 also can be configured to communicate with one or more databases. The one or more database can comprise a product database that contains information about products sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s) and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between user interaction system 310, promotion system 320, display system 360 and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
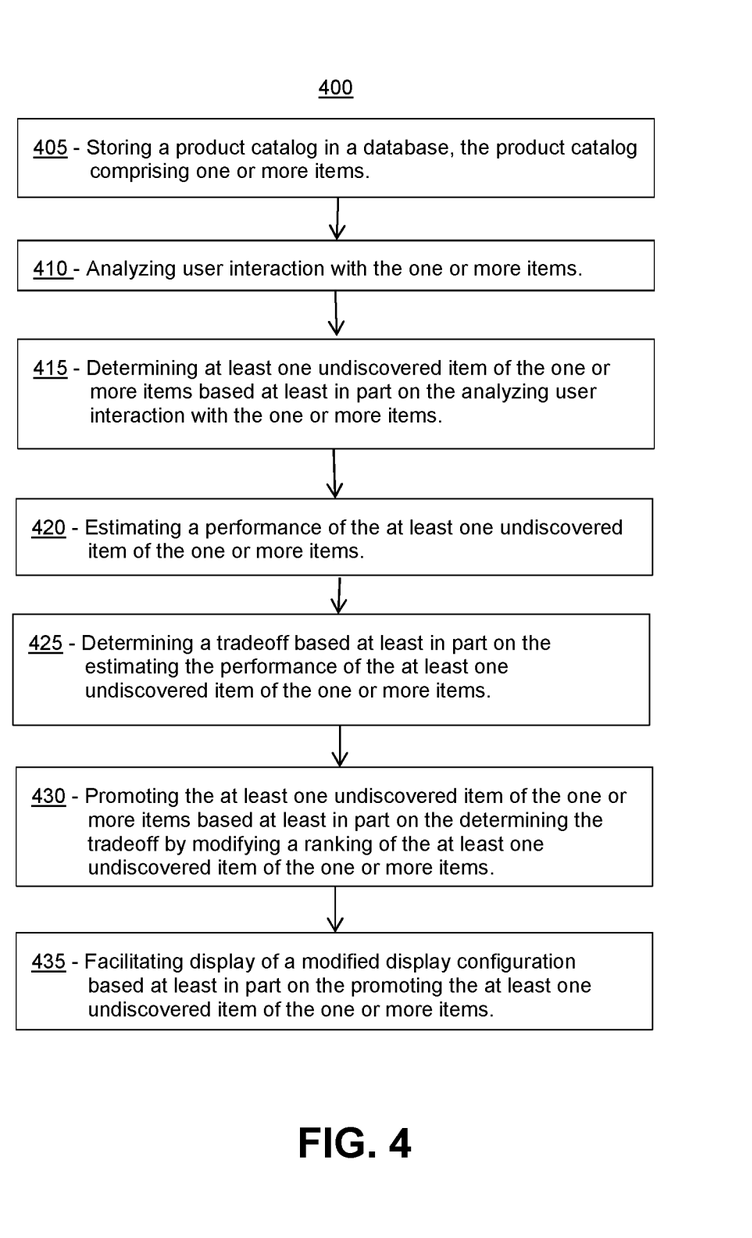
FIG. 4 is a flowchart for a method, according to an embodiment.
Figure 6:
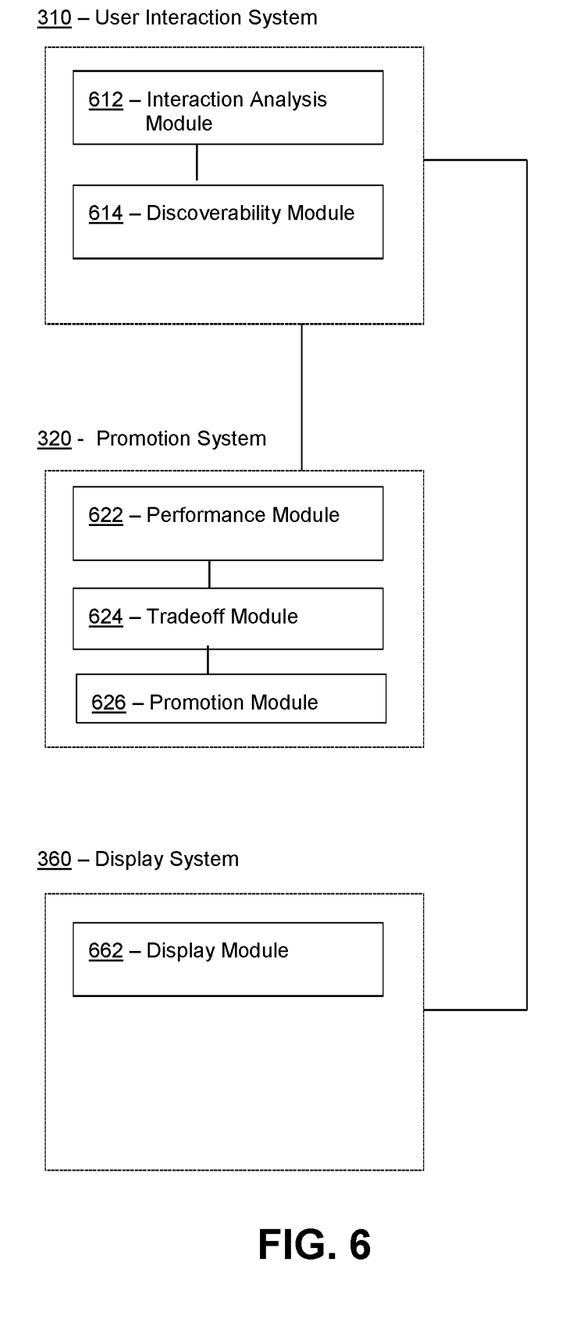
FIG. 6 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 612, 614, 622, 624, 626, and/or 662 (FIG. 6). Such non-transitory memory storage modules can be part of a computer system such as user interaction system 310 (FIG. 3), promotion system 320 (FIG. 3), and/or display system 360 (FIG. 3). The processing module(s) can be similar or identical to the processing module(s) described above with respect to computer system 100 (FIG. 1).

Method 400 can comprise an activity 405 of storing a product catalog in a database, the product catalog comprising one or more items. In many embodiments, method 400 can further comprise an activity 410 of analyzing user interaction with the one or more items. In some embodiments, activity 410 of analyzing user interaction with the one or more items can comprise determining a number of impressions for each item of the one or more items. In many embodiments, analyzing user interaction can be referred to as analyzing interactions by one or more users of the eCommerce website. Impressions can refer to when an item is viewed by one or more users. In many embodiments, an item can be considered viewed by any of one or more users when the item is located on a webpage that the user has clicked on. In some embodiments, analyzing user interaction with the one or more items can comprise determining a number of item clicks by one or more users, a number of item add-to-carts by the one or more users, a number of item orders by the one or more users, an amount of revenue generated by item sales to the one or more users, and/or an amount of margin dollars generated by item sales to the one or more users.

In many embodiments, method 400 can further comprise an activity 415 of determining at least one undiscovered item of the one or more items based at least in part on the analyzing user interaction with the one or more items. An undiscovered item can be an item in the product catalog that is ranked in a higher numbered position. These higher number positioned items can be less likely to be selected or viewed, and can be considered undiscovered or non-discoverable. In some embodiments, undiscovered can be a new item that is being considered for inclusion in the product catalog.

In some embodiments activity 415 of determining the at least one undiscovered item of the one or more items based at least in part on the analyzing the user interaction with the one or more items can comprise determining that an item of the one or more items is undiscovered if a number of impressions for the item of the one or more items is less than an impression constant. In some embodiments, the impression constant can comprise a number of impressions of the item of the one or more items over a time period. In some embodiments, the time period can comprise approximately 24 hours, one week, two weeks, one month, two months, three months, one calendar quarter, 180 days, or one year. In some embodiments, the impression constant can be an inverse of a ratio of an add-to-cart rate to first page impressions. In some embodiments, the ratio of the add-to-cart rate to the first page impressions can be approximately 1:1000, and the impression constant can be approximately 1000. In many embodiments, an item with an impression number greater than the impression constant can have a lower page position (e.g., first page position or positions 1-20).

In many embodiments, method 400 can comprise an activity 420 of estimating a performance of the at least one undiscovered item of the one or more items. In many embodiments, estimating the performance of the at least one undiscovered item of the one or more items can be based at least in part on a predicted add-to-cart rate. This estimate can be based on the prior performance of the at least one undiscovered item being added to a user's cart after being viewed or on the prior performance of the one or more items being added to a user's cart after being viewed. In some embodiments, activity 420 of estimating the performance can comprise estimating performance of a potential new item that could be added to the product catalog.

In some embodiments, method 400 can comprise an activity 425 of determining a tradeoff based at least in part on the estimating the performance of the at least one undiscovered item of the one or more items. As discussed further below, in many embodiments, the tradeoff can comprise at least in part an opportunity cost. In some embodiments, the opportunity cost can be the estimated change in the number of items added to a user's cart during a time period resulting from promoting the at least one undiscovered item over one or more other undiscovered and/or discovered items. In some embodiments, the time period can be approximately 24 hours, one week, two weeks, one month, two months, three months, one calendar quarter, 180 days, or one year. By way of example and without any limitation, promoting a particular undiscovered item over another undiscovered item or a discovered item (e.g., decreasing a particular discovered item from position 20 to 21, thereby removing the particular discovered item from a first page when each page comprises 20 items) can result in an increase in the estimated number of times the particular undiscovered item is added to a user's cart and a decrease in the estimated number of times the particular discovered item is added to a user's cart; in some embodiments, the opportunity cost can be computed as the sum of the increase in the estimated number of times the particular undiscovered item is added to a user's cart and the decrease in the estimated number of times the particular discovered item is added to a user's cart. In many embodiments, the opportunity cost can be based on a number of clicks, a number of page views, a number of add-to-carts, a number of orders, an amount of revenue from sales (e.g., actual dollars received), and/or an amount of margin dollars from sales of the one or more items.

In many embodiments, the tradeoff can comprise at least in part an equality measure. In some embodiments, the equality measure can be based at least in part on a Theil index. The Theil index can range from a maximum equality, when all items receive the same number of impressions, to a minimum equality, when one item receives all the impressions. In some embodiments, the equality measure can be computed from the Theil index:

(1−Theil index)/ln(x)

In many embodiments, x can be the total number of impressions. In many embodiments, the Theil index can be expressed as:

$$\text{Theil index} = \frac{1}{N}\sum_{i=1}^{N}\left(\frac{x_i}{\overline{x}} * \ln\frac{x_i}{\overline{x}}\right)$$

In many embodiments, N comprises a total number of items, $x_i$ comprises the number of impressions of item i, and $\overline{x}$ comprises an average number of impressions of all the items.

In a number of embodiments, method 400 can comprise an activity 430 of promoting the at least one undiscovered item of the one or more items based at least in part on the determining the tradeoff. In many embodiments, activity 430 of promoting the at least one undiscovered item of the one or more items based at least in part on the determining the tradeoff can comprise modifying a ranking of the at least one undiscovered item of the one or more items. In some embodiments, modifying the ranking of the at least one undiscovered item of the one or more items can comprise promoting the at least one undiscovered item of the one or more items to a lower page number (e.g., from page 5 to page 1). In many embodiments, modifying the ranking of the at least one undiscovered item of the one or more items can comprise promoting the at least one undiscovered item of the one or more items to a position that is higher on the display or current page (e.g., within a set of the first five items on a page or "above the fold").

In some embodiments, method 400 can further comprise an activity 435 of facilitating display of a modified display configuration based at least in part on the promoting the at least one undiscovered item of the one or more items. In many embodiments, activity 435 of facilitating display of a modified display configuration based at least in part on the promoting the at least one undiscovered item of the one or more items can comprise modifying a first display configuration of items on a returned page by inserting a promoted undiscovered item to create a second display configuration of items on the returned page.

In some embodiments, method 400 can further comprise determining an add-to-cart rate model for the predicted add-to-cart rate for the one or more items. In many embodiments, determining an add-to-cart rate model for the predicted add-to-cart rate for the one or more items can be based at least in part on historical product performance of each of the one or more items. In some embodiments, the historical product performance can comprise analyzing a number of times an item has been viewed, added-to-cart, and/or ordered (e.g., purchased). In some embodiments, the historical product performance can further or also comprise analyzing an amount of revenue and/or margin dollars generated by sales of an item. In some embodiments determining an add-to-cart rate model for the predicted add-to-cart rate for the one or more items can be based on one or more attributes of each of the one or more items and/or one or more attributes relating each of the one or more items to the user request. In some embodiments, a first item with one or more similar attributes to a second item can comprise or be assumed to have a predicted add-to-cart rate similar to the second item's predicted add-to-cart rate and/or historical product performance. In some embodiments, the one or more attributes can comprise brand, size, shape, color, price, weight, and/or shipping option of the item. In some embodiments, the one or more attributes can comprise a title, description, and/or inventory availability of the item. In some embodiments, the one or more attributes can comprise indicators of whether the brand, size, shape, color, price, weight, and/or shipping option of the item match to elements of the user request. In some embodiments, the one or more attributes can comprise metrics measuring how closely a title, description, and/or other descriptive field of the item match to elements of the user request. In many embodiments, determining an add-to-cart rate model for the predicted add-to-cart rate for the one or more items can comprise building a machine learning model. In some embodiments, the machine learning model can comprise a linear regression model, a logistic regression model, a decision tree, a random forest, a neural network and/or an ensemble of such models.

Figure 5:
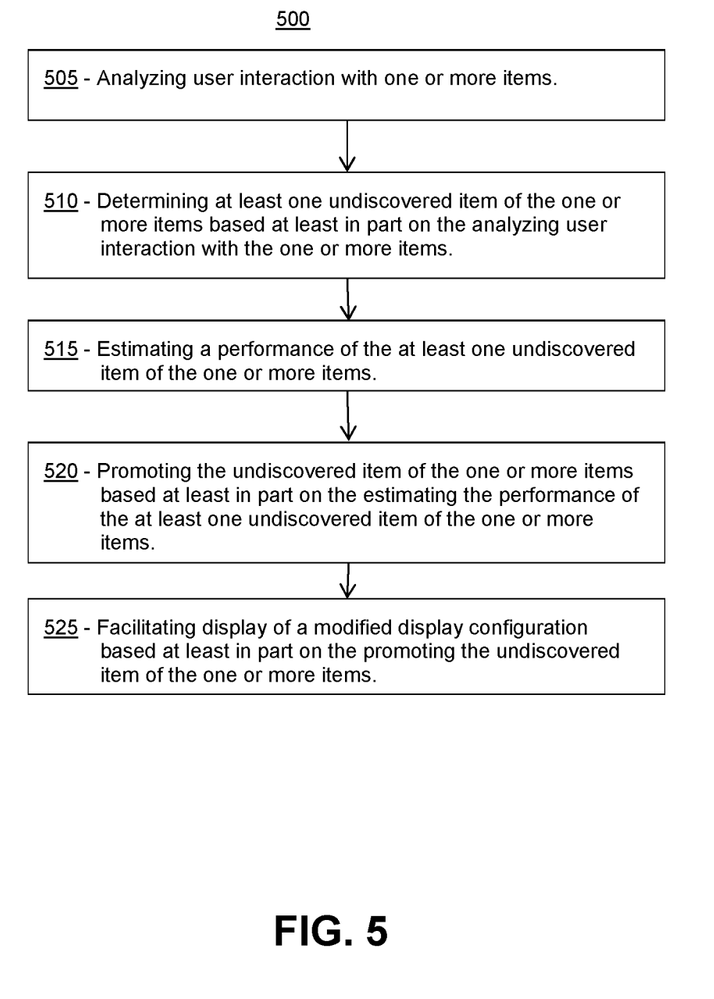
FIG. 5 illustrates a flowchart for a method, according to another embodiment.

Turning ahead in the drawings, FIG. 5 illustrates a flow chart for a method 500, according to another embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 612, 614, 622, 624, 626, and/or 662 (FIG. 6). Such non-transitory memory storage modules can be part of a computer system such as user interaction system 310 (FIG. 3), promotion system 320 (FIG. 3) and/or display system 360 (FIG. 3). The processing module(s) can be similar or identical to the processing module(s) described above with respect to computer system 100 (FIG. 1). In some embodiments, method 500 can be similar to method 400.

In many embodiments, method 500 can comprise an activity 505 of analyzing user interaction with one or more items. In some embodiments, activity 505 of analyzing user interaction with one or more items can comprise determining a number of impressions for each item of the one or more items. In some embodiments, activity 505 can be similar to activity 410 (FIG. 4), and vice versa.

Method 500 can further comprise an activity 510 of determining at least one undiscovered item of the one or more items based at least in part on the analyzing user interaction with the one or more items. In many embodiments, activity 510 of determining at least one undiscovered item of the one or more items based at least in part on the analyzing user interaction with the one or more items can comprise determining that an item of the one or more items is undiscovered if a number of impressions for the item of the one or more items is less than an impression constant, the impression constant comprises a number of impressions of the item of the one or more items over a time period. In many embodiments, activity 510 can be similar to activity 415 FIG. 4), and vice versa.

In various embodiments, method 500 can further comprise an activity 515 of estimating a performance of the at least one undiscovered item of the one or more items. In some embodiments, activity 515 of estimating a performance of the at least one undiscovered item of the one or more items can comprise estimating the performance of the at least one undiscovered item of the one or more items based at least in part on a predicted add-to-cart rate. In a number of embodiments, method 500 can further comprise determining an add-to-cart rate model for the predicted add-to-cart rate for the one or more items based at least in part on historical product performance of each of the one or more items and/or one or more attributes of each of the one or more items. In many embodiments, activity 515 can be similar to activity 420 (FIG. 4), and vice versa.

In a number of embodiments, method 500 can comprise an activity 520 of promoting the at least one undiscovered item of the one or more items based at least in part on the estimating the performance of the at least one undiscovered item of the one or more items. In some embodiments, activity 520 of promoting the at least one undiscovered item of the one or more items based at least in part on the estimating the performance of the at least one undiscovered item of the one or more items comprises accounting for a tradeoff or opportunity cost of promoting an item. In some embodiments, activity 520 of promoting the at least one undiscovered item of the one or more items based at least in part on the estimating the performance of the at least one undiscovered item of the one or more items does not comprise accounting for a tradeoff or opportunity cost of promoting an item. In some embodiments, activity 520 can be similar to activity 430 (FIG. 4), and vice versa.

Method 500 can further comprise an activity 525 of facilitating display of a modified display configuration based at least in part on the promoting the at least one undiscovered item of the one or more items. In some embodiments, activity 525 can be similar to activity 435 (FIG. 4), and vice versa.

FIG. 6 illustrates a block diagram of a portion of system 300 comprising user interaction system 310, promotion system 320, and display system 360, according to the embodiment shown in FIG. 3. User interaction system 310, promotion system 320, and display system 360 each are merely exemplary and are not limited to the embodiments presented herein. User interaction system 310, promotion system 320, and display system 360 each can be employed in many different embodiments or examples not specifically depicted or described herein. In some embodiments, certain elements or modules of user interaction system 310, promotion system 320, and display system 360 can perform various procedures, processes, and/or acts. In other embodiments, the procedures, processes, and/or acts can be performed by other suitable elements or modules.

In many embodiments, user interaction system 310 can comprise non-transitory memory storage modules 612 and 614, promotion system 320 can comprise non-transitory memory storage modules 622, 624, and 626, and display system 360 can comprise a non-transitory memory storage module 662. Memory storage module 612 can be referred to as an interaction analysis module 612, and memory storage module 614 can be referred to as a discoverability module 614. Memory storage module 622 can be referred to as a performance module 622, memory storage module 624 can be referred to as a tradeoff module 624, and memory storage module 626 can be referred to as a promotion module 626. Memory storage module 662 can be referred to as a display module 662.

In many embodiments, interaction analysis module 612 can store computing instructions configured to run on one or more processing modules and perform one or more acts of methods 400 (FIG. 4), and/or 500 (FIG. 5) (e.g., activity 410 of analyzing user interaction with the one or more items (FIG. 4), or activity 505 of analyzing user interaction with one or more items (FIG. 5)). In some embodiments, discoverability module 614 can store computing instructions configured to run on one or more processing modules and perform one or more acts of methods 400 (FIG. 4) and/or 500 (FIG. 5) (e.g., activity 415 determining at least one undiscovered item of the one or more items based at least in part on the analyzing user interaction with the one or more items (FIG. 4) or activity 510 of determining at least one undiscovered item of the one or more items based at least in part on the analyzing user interaction with the one or more items (FIG. 5)).

In many embodiments, performance module 622 can store computing instructions configured to run on one or more processing modules and perform one or more acts of methods 400 (FIG. 4) and/or 500 (FIG. 5) (e.g., activity 420 of estimating a performance of the at least one undiscovered item of the one or more items (FIG. 4) or activity 515 of estimating a performance of the at least one undiscovered item of the one or more items (FIG. 5)). In a number of embodiments, tradeoff module 624 can store computing instructions configured to run on one or more processing modules and perform one or more acts of methods 400 (FIG. 4) (e.g., activity 425 of determining a tradeoff based at least in part on the estimating the performance of the at least one undiscovered item of the one or more items. (FIG. 4)). In some embodiments, promotion module 626 can store computing instructions configured to run on one or more processing modules and perform one or more acts of methods 400 (FIG. 4) and/or 500 (FIG. 5) (e.g., activity 430 of promoting the at least one undiscovered item of the one or more items based at least in part on the determining the tradeoff by modifying a ranking of the at least one undiscovered item of the one or more items (FIG. 4), or activity 520 of promoting the at least one undiscovered item of the one or more items based at least in part on the estimating the performance of the at least one undiscovered item of the one or more items (FIG. 5)).

In many embodiments, display module 662 can store computing instructions configured to run on one or more processing modules and perform one or more acts of methods 400 (FIG. 4) and/or 500 (FIG. 5) (e.g., activity 435 of facilitating display of a modified display configuration based at least in part on the promoting the at least one undiscovered item of the one or more items (FIG. 4) or activity 525 of (FIG. 5)).

Although systems and methods for an item discoverability been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIGS. 3-6 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processing modules; and one or more non-transitory storage modules storing computing instructions configured to run on the one or more processing modules and perform the acts of:

storing a product catalog in a database, the product catalog comprising multiple items;

analyzing user interaction, received from a user interface of a user computer, with the multiple items by:

determining a respective number of impressions for each item of the multiple items;

determining that a first item of the multiple items is a first undiscovered item based at least in part on the analyzing the user interaction, received from the user interface of the user computer, with the multiple items, when a number of impressions for the first item is less than an impression constant, wherein the impression constant is determined based on impressions for first page items of the multiple items;

determining a tradeoff based at least in part on
an equality measure determined based on a number of impressions for the first undiscovered item and a Theil index calculated based on a respective number of impressions for each of the multiple items;
promoting the first undiscovered item based at least in part on the determining the tradeoff by modifying a ranking of the first undiscovered item; and
facilitating displaying of a modified display configuration, in the user interface of the user computer, based at least in part on the promoting the first undiscovered item.

2. The system of claim 1, wherein:
modifying the ranking of the first undiscovered item comprises promoting the first undiscovered item to a lower position number.

3. The system of claim 1, wherein:
the computing instructions are further configured to perform the acts of:
estimating a performance of the first undiscovered item based at least in part on a predicted add-to-cart rate for the first undiscovered item; and
determining the tradeoff is further based at least in part on the estimating the performance of the first undiscovered item.

4. The system of claim 3, further comprising:
determining an add-to-cart rate model for a respective predicted add-to-cart rate for each of the multiple items based at least in part on:
historical product performance of each of the multiple items; and
one or more attributes of each of the multiple items.

5. The system of claim 3, wherein:
modifying the ranking of the first undiscovered item comprises promoting the first undiscovered item to a lower position number;
a respective predicted add-to-cart rate for each of the multiple items is based at least on determining an add-to-cart rate model;
determining the add-to-cart rate model is based at least in part on:
historical product performance of each of the multiple items; and
one or more attributes of each of the multiple items; and
the one or more attributes comprise at least one of:
brand;
size;
shape;
color;
price;
weight; or
shipping option.

6. The system of claim 4, wherein:
the one or more attributes comprise at least one of:
brand;
size;
shape;
color;
price;
weight; or
shipping option.

7. The system of claim 1, wherein:
determining the tradeoff further comprises:
estimating a performance of the first undiscovered item;
estimating a performance of a competing item of the multiple items, the competing item being one of:
a second item of the multiple items to be replaced by the first undiscovered item; or
a second undiscovered item of the multiple items;
determining an opportunity cost by comparing the performance of the first undiscovered item and the performance of the competing item; and
further determining the tradeoff based at least in part on the opportunity cost.

8. A method comprising:
storing a product catalog in a database, the product catalog comprising multiple items;
analyzing user interaction, received from a user interface of a user computer, with the multiple items by:
determining a respective number of impressions for each item of the multiple items;
determining that a first item of the multiple items is a first undiscovered item based at least in part on the analyzing the user interaction, received from the user interface of the user computer, with the multiple items,
when a number of impressions for the first item is less than an impression constant, wherein
the impression constant is determined based on a number of impressions for first page items of the multiple items;
determining a tradeoff based at least in part on
an equality measure determined based on a number of impressions for the first undiscovered item and a Theil index calculated based on a respective number of impressions for each of the multiple items;
promoting the first undiscovered item based at least in part on the determining the tradeoff by modifying a ranking of the first undiscovered item; and
facilitating display of a modified display configuration, in the user interface of the user computer, based at least in part on the promoting the first undiscovered item.

9. The method of claim 8, wherein:
modifying the ranking of the first undiscovered item comprises promoting the first undiscovered item to a lower page number.

10. The method of claim 8 further comprising:
estimating a performance of the first undiscovered item is-based at least in part on a predicted add-to-cart rate for the first undiscovered item,
wherein:
determining the tradeoff is further based at least in part on the estimating the performance of the first undiscovered item.

11. The method of claim 10, further comprising:
determining an add-to-cart rate model for a respective predicted add-to-cart rate for each of the multiple items based at least in part on:
historical product performance of each of the multiple items; and
one or more attributes of each of the multiple items.

12. The method of claim 10, wherein:
modifying the ranking of the first undiscovered item comprises promoting the first undiscovered item to a lower page number;
a respective predicted add-to-cart rate for each of the multiple items is based at least on determining an add-to-cart rate model;
determining the add-to-cart rate model is based at least in part on:
historical product performance of each of the multiple items; and one or more attributes of each of the multiple items; and
the one or more attributes comprise at least one of:
  brand;
  size;
  shape;
  color;
  price;
  weight; or
  shipping option.

13. The method of claim 11, wherein:
the one or more attributes comprise at least one of:
  brand;
  size;
  shape;
  color;
  price;
  weight; or
  shipping option.

14. The method of claim 8, wherein:
determining the tradeoff further comprises:
  estimating a performance of the first undiscovered item;
  estimating a performance of a competing item of the multiple items, the competing item being one of:
    a second item of the multiple items to be replaced by the first undiscovered item; or
    a second undiscovered item of the multiple items;
  determining an opportunity cost by comparing the performance of the first undiscovered item and the performance of the competing item; and
  further determining the tradeoff based at least in part on the opportunity cost.

15. A method comprising:
analyzing user interaction, received from a user interface of a user computer, with multiple items by:
  determining a respective number of impressions for each item of the multiple items;
determining that a first item of the multiple items is a first undiscovered item based at least in part on the analyzing the user interaction, received from the user interface of the user computer, with the multiple items,
  when a number of impressions for the first item is less than an impression constant, wherein
    the impression constant is determined based on a number of impressions for first page items of the multiple items;
promoting the first undiscovered item based at least in part on
  an equality measure determined based on a number of impressions for the first undiscovered item and a Theil index calculated based on a respective number of impressions for each of the multiple items; and
facilitating display of a modified display configuration, in the user interface of the user computer, based at least in part on the promoting the first undiscovered item.

16. The method of claim 15 further comprising:
estimating a performance of the first undiscovered item based at least in part on a predicted add-to-cart rate for the first undiscovered item,
wherein:
  promoting the first undiscovered item is further based at least in part on the estimating the performance of the first undiscovered item.

17. The method of claim 16, further comprising:
determining an add-to-cart rate model for a respective predicted add-to-cart rate for each of the multiple items based at least in part on:
  historical product performance of each of the multiple items; and
  one or more attributes of each of the multiple items.

18. The method of claim 17, wherein:
the one or more attributes comprise at least one of:
  brand;
  size;
  shape;
  color;
  price;
  weight; or
  shipping option.

19. The method of claim 16, wherein:
a respective predicted add-to-cart rate for each of the multiple items is based at least on determining an add-to-cart rate model;
determining the add-to-cart rate model is based at least in part on:
  historical product performance of each of the multiple items; and
  one or more attributes of each of the multiple items; and
the one or more attributes comprise at least one of:
  brand;
  size;
  shape;
  color;
  price;
  weight; or
  shipping option.

20. The method of claim 15 further comprising:
estimating a performance of the first undiscovered item;
estimating a performance of a competing item of the multiple items, wherein:
  the competing item is one of:
    a second item of the multiple items to be replaced by the first undiscovered item; or
    a second undiscovered item of the multiple items; and
comparing the performance of the first undiscovered item and the performance of the competing item,
wherein:
  promoting the first undiscovered item is further based at least in part on the comparing the performance of the first undiscovered item and the performance of the competing item.

* * * * *